United States Patent [19]

Wells

[11] Patent Number: 5,415,439
[45] Date of Patent: May 16, 1995

[54] MISALIGNMENT FITTING

[75] Inventor: Thomas A. Wells, Fairfield, Ohio

[73] Assignee: General Electric Company, Cincinnati, Ohio

[21] Appl. No.: 191,750

[22] Filed: Feb. 3, 1994

Related U.S. Application Data

[63] Continuation of Ser. No. 933,549, Aug. 24, 1992, abandoned.

[51] Int. Cl.6 ............................................. F16L 27/08
[52] U.S. Cl. .................................. 285/261; 285/367; 285/332.1; 285/334.5
[58] Field of Search ............... 285/261, 263, 264, 267, 285/366, 367, 332.1, 334.5

[56] References Cited

U.S. PATENT DOCUMENTS

| | | | |
|---|---|---|---|
| 1,607,254 | 11/1926 | Fantz | 285/332.1 |
| 1,949,055 | 2/1934 | Lambie | 285/261 X |
| 2,295,716 | 9/1942 | Cox | 285/120 |
| 2,602,678 | 7/1952 | Mahoff et al. | 285/129 |
| 2,788,993 | 4/1957 | Oldham | 285/174 |
| 3,544,137 | 12/1970 | Contreras et al. | 285/261 |
| 3,865,413 | 2/1975 | Mizusawa et al. | 285/334.5 X |
| 3,966,240 | 6/1976 | Enomoto | 285/367 |
| 4,486,037 | 12/1984 | Shotbolt | 285/261 |
| 4,695,080 | 9/1987 | Oetiker | 285/334.5 |
| 4,779,901 | 10/1988 | Halling | 285/261 X |
| 5,141,259 | 8/1992 | Highlen et al. | 285/263 |

FOREIGN PATENT DOCUMENTS

| | | | |
|---|---|---|---|
| 511690 | 12/1953 | Belgium | 285/407 |
| 645613 | 10/1928 | France | 285/366 |
| 0267309 | 9/1929 | Italy | 285/261 |
| 60-116813 | 6/1985 | Japan . | |
| 14227 | 11/1885 | United Kingdom | 285/332.1 |
| 0195204 | 3/1923 | United Kingdom | 285/261 |
| 0331978 | 7/1930 | United Kingdom | 285/261 |

*Primary Examiner*—Randolph A. Reese
*Assistant Examiner*—Heather Chun Shackelford
*Attorney, Agent, or Firm*—Jerome C. Squillaro; Bernard E. Shay

[57] ABSTRACT

A coupling for joining a pair of conduits, one of the conduits having a flared end and the other of the conduits having a circumferential flange with a surface conforming generally for mating with the flared end of the one of the conduits. The coupling comprises a first annular ring positioned about the one of the conduits and having an inner diameter less than an outer diameter of the flared end and a radially inner surface adapted for engaging an outer surface of the flared end. A second annular ring is positioned about the other of the conduits and has an inner diameter less than an outer diameter of the circumferential flange and has a surface adapted for engaging a surface of the flange. A split ring circumscribes the first and second rings and has a radially inner, generally V-shaped groove for simultaneously overlapping both the first and second rings. The split ring has first and second circumferentially spaced ends joined by a bolt for drawing the split ring tightly about the first and second rings so that the first and second rings are urged toward each other by opposing sides of the V-shaped groove for coupling the pair of conduits.

5 Claims, 3 Drawing Sheets

MISALIGNMENT FITTING

This application is a Continuation of application Ser. No. 07/933,549, filed Aug. 24, 1992, now abandoned.

BACKGROUND OF THE INVENTION

The present invention relates to fluid conduit systems and, more particularly, to apparatus for coupling ends of a pair of conduits without requiring axial alignment of the conduits.

High pressure air lines or conduits of the type used in, for example, aircraft gas turbine engines, are provided with numerous couplings to permit various sections of an engine to be easily assembled or disassembled. As often occurs with connecting relatively flexible conduits, the ends may not axially align. In order to accommodate potential misalignment, some conduits are provided with a flare and flange arrangement commonly referred to as a Hemsworth fitting. FIG. 1 is a cross-sectional view of a Hemsworth fitting illustrating a conventional method for connecting ends of a pair of conduits 10 and 12. The conduit 10 has a flared end 14 formed with a radiused or arcuate surface at 16. The conduit 12 terminates in an annular flange 18 which has an outer arcuately shaped surface 20 which mates with the surface 16 of conduit 10. The arcuate shape of the surfaces 16 and 20 allows misalignment of the conduits 10 and 12 with respect to each other, i.e., conduit 10 may have an axis which is not aligned with axis 22 of conduit 12. The phantom lines 24 and 26 indicate off-axis extreme positions of conduit 10 with respect to conduit 12.

The conduits 10 and 12 are retained in an assembled position by a pair of annular couplers 28 and 30 which are similar to a conventional plumbing union. Coupler 28 fits around conduit 10 and has an inner diameter which is less than the extreme outer diameter of flared end 14. The outer circumferential surface of coupler 28 is threaded and fits within and threadingly engages a threaded inner surface of coupler 30. Coupler 30 includes an annular flange 32 which extends adjacent conduit 12 and engages flange 18. When coupler 28 is threaded into coupler 30, coupler 28 reacts against flared end 14 forcing it against flange 18 which is in turn urged toward flared end 14 by flange 32 on coupler 30.

Assembly of the coupling between conduits 10 and 12 requires a pair of spanner wrenches, one to turn coupler 28 and another to turn coupler 30. Coupler 28 has a pair of tabs 34 with holes 36 for receiving pins on a conventional spanner wrench. Typically, coupler 28 is held in a fixed position while coupler 30 is turned. Coupler 30 has a plurality of circumferentially spaced holes 38 for receiving the spanner wrench pins. During this assembly, it is desirable to place a relatively high compressive force on the joint between conduits 10 and 12. An exemplary force is about 4000 pounds compression. In order to produce this force, a torque of about 150 foot-pounds is exerted on the threaded couplers 28 and 30. Not only is this a difficult task to achieve in using a pair of spanner wrenches, the confined quarters in which these couplings are often positioned makes the task more difficult. Accordingly, it is desirable to provide a method and apparatus for assembling a joint between conduit sections which overcomes the above discussed disadvantages of the prior art, specifically, a coupling which: allows axial misalignment of mating high pressure air conduits; and improves ease of installation by reducing the torque level required to achieve adequate compressive force in order to effect a satisfactory seal, eliminating the need for special tooling, and providing for easy access to the tightening means.

SUMMARY OF THE INVENTION

The above and other disadvantages of the prior art are overcome in a coupling for joining a pair of conduits, one of the conduits having a flared end and the other of the conduits having a circumferential flange with a surface conforming generally for mating with the flared end of the one of the conduits. The coupling comprises a first annular ring positioned about the one of the conduits and having an inner diameter less than an outer diameter of the flared end and having a radially inner surface adapted for engaging an outer surface of the flared end. A second annular ring positioned about the other of the conduits has an inner diameter less than an outer diameter of the circumferential flange and has a surface adapted for engaging a surface of the flange. A split ring circumscribes the first and second rings. The split ring has a radially inner, generally V-shaped groove for simultaneously overlapping both the first and second rings. First and second circumferentially spaced ends of the split ring are coupled by a single bolt which allows the ring to be drawn tightly about the first and second rings which thereby urged toward each other by opposing sides of the V-shaped groove, thus coupling the pair of conduits.

Preferably, the flared end of the one of the conduits has a generally arcuate shape and the mating flange surface conforms to the arcuate shape allowing an off-axis coupling. The radially inner surface of the first ring may also have a shape conforming to the arcuate shape of the flared end. In one form, the split ring comprises first and second segments joined together by a hinge type connection for enabling positioning about the conduits without distortion of the split ring.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
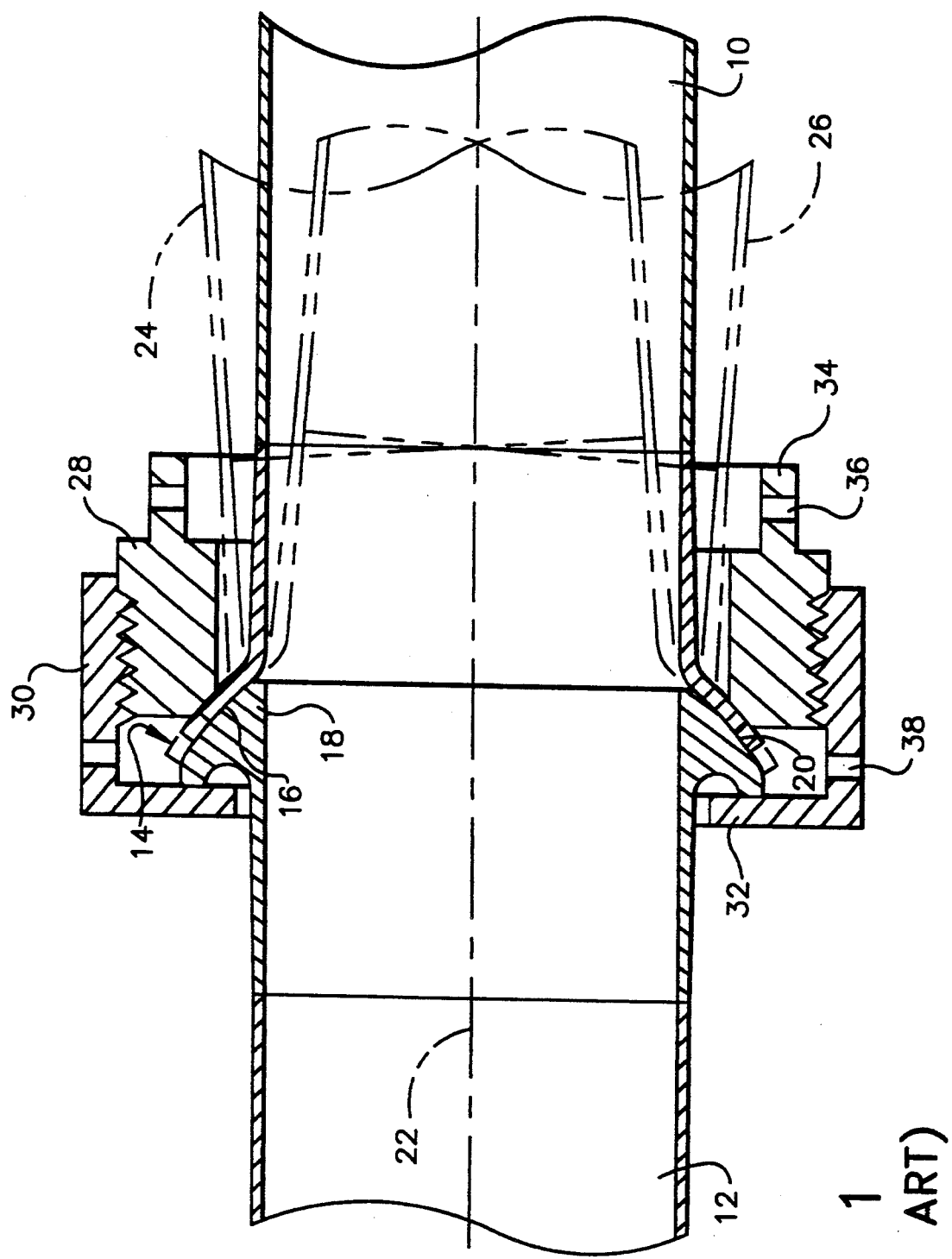
FIG. 1 is a cross-sectional view of a prior art misalignment fitting.
Figure 2:
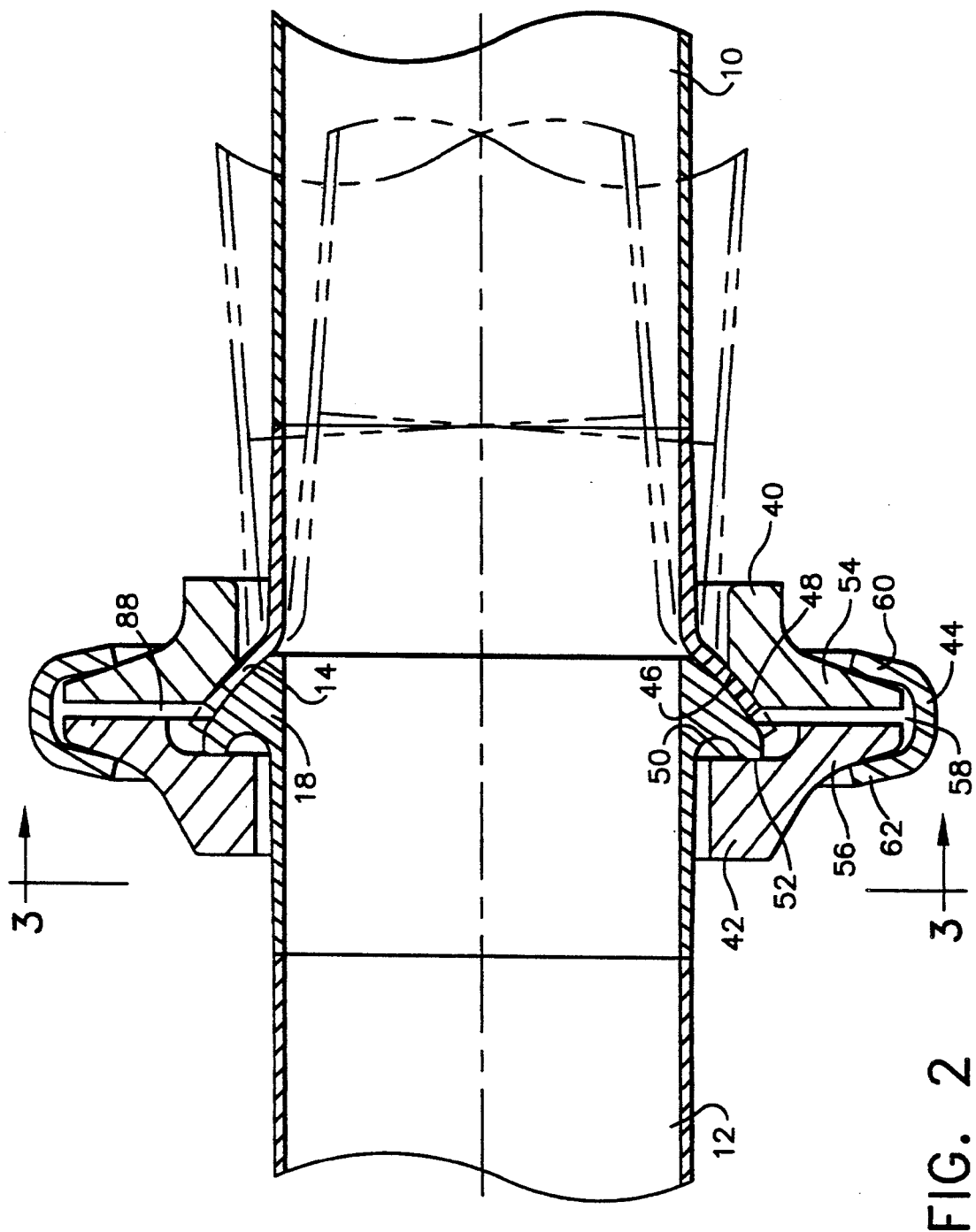
FIG. 2 is a cross-sectional view of a misalignment fitting in accordance with the present invention.
Figure 3:
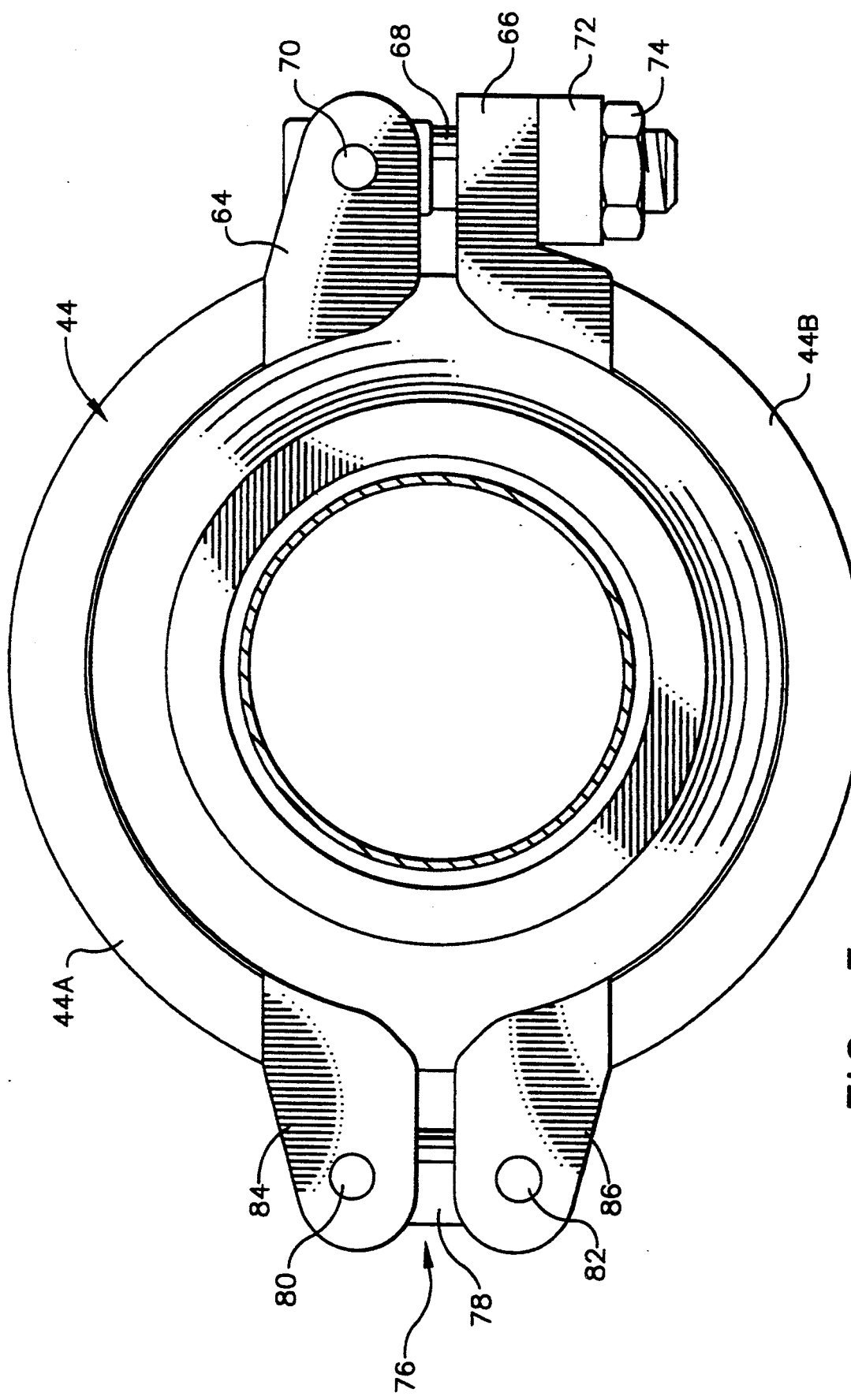
FIG. 3 is a view taken along the lines 3—3 of FIG. 2.

Referring to FIGS. 2 and 3, there are shown cross-sectional and axial views, respectively of a coupling arrangement in accordance with the present invention. The pair of conduits 10 and 12 include the same Hemsworth fittings as described in FIG. 1, i.e., conduit 10 has a flared end 14 and conduit 12 has an annular flange 18. The flared end 14 and annular flange 18 have radiused or arcuate mating surfaces which allow axial misalignment of the conduits. The two conduit sections are held together by a pair of annular rings 40 and 42 and a split ring 44. The ring 40 is positioned about conduit 10 and has an inner diameter less than the extreme outer diameter of flared end 14. The ring 40 has a radially inner surface at 46 which engages an outer surface 48 of flared end 14. The ring 42 is positioned about conduit 12 and has an inner diameter less than an outer diameter of circumferential flange 18. The ring 42 has a generally flat axial surface 50 adapted for engaging a surface 52 on flange 18.

In the illustrative embodiment, both the rings 40 and 42 have a generally L-shaped cross section with one arm extending generally parallel to the conduit sections and another arm 54 and 56, respectively, extending generally perpendicularly from the conduit sections. The split ring 44 has a generally V-shaped (or spread U-shaped) cross section with a V-shaped radially inner groove 58 which is adapted for fitting over the outwardly extending arms 54 and 56 of rings 40 and 42. The groove 58 is defined by a pair of angularly, radially inward extending arms 60 and 62. Arm 60 engages arm 54 of ring 40 and arm 62 engages arm 56 of ring 42.

By reference to FIG. 3, it can be seen that the split ring 44 has respective end flanges 64 and 66, which may be formed integrally with the ring. A bolt 68 extends between the flanges 64 and 66 and provides a means of drawing ring 44 tightly about rings 40 and 42. The bolt 68 has one end pinned to flange 64 by a pin 70 and a second end extending through flange 66. The flange 66 may be formed as a clevis or have a hole therethrough for passing the bolt 68. A washer 72 and nut 74 are shown on bolt 68. Tightening of the nut 74 onto bolt 68 will draw ring 44 about rings 40 and 42. For ease of assembly of ring 44 about the conduit sections, the ring may be formed in two sections 44A and 44B joined together by a hinge assembly 76 comprising a bar 78 pinned to each ring section by pins 80 and 82. The ring 44 is preferably formed with flanges 84 and 86, generally similar to flange 64, to enable attachment of bar 78.

When nut 74 is tightened onto bolt 68, the arms 60 and 62 of ring 44 urge annular rings 40 and 42 toward each other by virtue of the force exerted on ring arms 54 and 56. The annular rings 40 and 42 are so designed that when the conduit sections 10 and 12 are in a desired assembled arrangement, a space 88 remains between the arms 54 and 56.

It is noted that the outer surface of flared end 14 generally conforms to the inner radiused surface 16 since the conduit is generally formed from relatively thin walled metal tubing, e.g., 0.040 inch thickness walls. For that reason, it is preferred that the inner surface 46 of rings 40 be similarly radiused. However, it is believed that a non-radiused conical surface at 46 could be used due to the large radius of surface 16.

As mentioned above, the prior art required two wrenches and a torque of about 150 foot-pounds to produce a compressive force of 4000 pounds. The present invention has been demonstrated to require a torque of only 150 inch-pounds on nut 74 to generate a compressive force of 5700 pounds. Furthermore, the required torque is independent of the diameter of the conduit.

While the invention has been described in what is considered to be a preferred embodiment, other variations and modifications will become apparent to those skilled in the art. It is intended, therefore, that the invention not be limited to the illustrative embodiment but be interpreted within the full spirit and scope of the appended claims.

What is claimed is:

1. A coupling for joining a pair of misaligned conduits, the coupling comprising:
    a first conduit having a flared end;
    a second conduit having a circumferential flange, said circumferential flange having a conforming mating surface for engagement with said flared end of said first conduit;
    a first annular ring positioned about said first conduit and having an inner diameter less than an outer diameter of said flared end, said first ring having a radially inner surface adapted for engaging an outer surface of said flared end;
    a second annular ring positioned about said second conduit and having an inner diameter less than an outer diameter of said circumferential flange, said second ring having a surface adapted for engaging a surface of said circumferential flange;
    a split ring circumscribing said first and second rings, said split ring having a radially inner, generally V-shaped groove for simultaneously overlapping both said first and second rings, said split ring having first and second circumferentially spaced ends and means coupled to said ends for drawing said split ring tightly about said first and second rings, said first and second rings being urged toward each other by opposing sides of said V-shaped groove for coupling the misaligned pair of conduits; and
    said first and second conduits coupled forming a metal-to-metal seal.

2. The coupling of claim 1 wherein said flared end of said first conduit has a generally arcuate shape and said conforming mating flange surface of said second conduit conforms to said arcuate shape allowing an off-axis coupling, said radially inner surface of said first ring having a shape conforming to said arcuate shape of said flared end.

3. The coupling of claim 1 wherein said split ring comprises first and second segments joined together by a hinge type connection for enabling positioning about said first and second conduits without distortion of said split ring and said means for drawing said split ring about said first and second rings comprises end flanges attached to each of said first and second ends and a single bolt extending between said end flanges for enabling said end flanges to be drawn one towards the other.

4. A coupling for joining a pair of misaligned conduits, said coupling comprising:
    a first conduit having a flared end of a generally arcuate shape;
    a second conduit having a circumferential flange, said circumferential flange having a mating surface conforming generally to said arcuate shape for allowing an off-axis coupling and mating with said flared end of said first conduit;
    a first annular ring positioned about said first conduit and having an inner diameter less than an outer diameter of said flared end, said first ring having a radially inner surface having a shape conforming to said arcuate shape of said flared end for engaging an outer surface of said flared end;
    a second annular ring positioned about said second conduit and having an inner diameter less than an outer diameter of said circumferential flange, said second ring having a surface adapted for engaging a surface of said circumferential flange;
    a split ring circumscribing said first and second rings, said split ring having a radially inner, generally V-shaped groove for simultaneously overlapping both said first and second rings, said split ring having first and second circumferentially spaced ends and means coupled to said ends for drawing said split ring tightly about said first and second rings including end flanges attached to each of said first and second ends and a single bolt extending between said end flanges for enabling said end flanges to be drawn one towards the other and said first and second rings being urged toward each other by opposing sides of said V-shaped groove for coupling the misaligned pair of conduits;

said first and second conduits coupled forming a metal-to-metal seal;

said first and second ring segments joined together by a hinge type connection for enabling positioning about the conduits without distorting said split ring.

5. A coupling for joining a pair of misaligned conduits, the coupling comprising:
a first conduit having a flared end;
a second conduit having a circumferential flange, said circumferential flange having a conforming mating surface for engagement with said flared end of said first conduit;
a first annular ring positioned about said first conduit and having an inner diameter less than an outer diameter of said flared end, said first ring having a radially inner surface adapted for engaging an outer surface of said flared end;
a second annular ring positioned about said first conduit and having an inner diameter less than an outer diameter of said circumferential flange, said second ring having a surface adapted for engaging a surface of said circumferential flange;
a split ring circumscribing said first and second rings, said split ring having a radially inner, generally V-Shaped groove for simultaneously overlapping both said first and second rings, said split ring having first and second circumferentially spaced ends and means coupled to said ends for drawing said split ring tightly about said first and second rings, said first and second rings being urged toward each other by opposing sides of said V-shaped groove for coupling the misaligned pair of conduits;

said first and second conduits coupled forming a metal-to-metal seal; and said flared end of said first conduit having a generally arcuate shape and said conforming mating flange surface of said second conduit conforming to said arcuate shape allowing off-axis coupling, said radially inner surface of said first ring having a shape conforming to said arcuate shape of said flared end.

* * * * *